(12) United States Patent
Davis

(10) Patent No.: US 7,862,115 B1
(45) Date of Patent: Jan. 4, 2011

(54) PROTECTIVE DEVICE FOR DEVELOPING INFANTS

(76) Inventor: Kimberly Danielle Davis, 5432 W. 8th St., Tulsa, OK (US) 74127

(*) Notice: Subject to any disclaimer, the term of this patent is extended or adjusted under 35 U.S.C. 154(b) by 0 days.

(21) Appl. No.: 12/036,783

(22) Filed: Feb. 25, 2008

(51) Int. Cl.
*A47C 31/00* (2006.01)
*A47D 15/00* (2006.01)

(52) U.S. Cl. .................. 297/219.12; 297/467; 297/487; 472/135

(58) Field of Classification Search ............... 297/219.2, 297/256.17, 274, 275, 464, 465, 467, 487; 224/158, 159, 160; 2/92, 111, 466; D29/101.3, D29/101.5; D3/213, 214; 472/118, 135
See application file for complete search history.

(56) References Cited

U.S. PATENT DOCUMENTS

| | | | | |
|---|---|---|---|---|
| 3,019,053 | A * | 1/1962 | Lambert | 297/275 |
| 3,027,058 | A * | 3/1962 | Huber | 224/155 |
| 4,469,259 | A * | 9/1984 | Krich et al. | 224/160 |
| 4,834,459 | A * | 5/1989 | Leach | 297/467 |
| 5,178,309 | A * | 1/1993 | Bicheler et al. | 224/153 |
| 5,297,852 | A * | 3/1994 | Morales-Quintero | 297/467 |
| 5,662,380 | A * | 9/1997 | Tam et al. | 297/354.12 |
| 5,678,739 | A * | 10/1997 | Darling et al. | 224/160 |
| 5,690,258 | A * | 11/1997 | Kataoka | 224/160 |
| 6,397,389 | B1 * | 6/2002 | Schultz | 2/69 |
| 7,252,214 | B2 * | 8/2007 | Krogh | 224/160 |
| 2005/0189386 | A1 * | 9/2005 | Mortell | 224/160 |
| 2007/0052278 | A1 * | 3/2007 | Jones | 297/485 |

* cited by examiner

*Primary Examiner*—Sarah B McPartlin
(74) *Attorney, Agent, or Firm*—James F. Harvey, III

(57) ABSTRACT

An inventive protective device for developing infants is provided, where the protective device is comprised of a triangularly-shaped, padded front portion conforming to the infant's chest, a triangularly-shaped, padded back portion conforming to the infant's back, and a crotch portion connecting the front and back portions. The front and back portions are each constructed of a plurality of tapering tubular-shaped structures extending from the top edge towards the crotch area, with the crotch portion lacking any padding. The inventive protective device fills the gap between the infant's torso and any seating enclosure into which the infant is placed, so as to reduce the chance for injury due to sudden and rapid movement against the enclosure.

17 Claims, 5 Drawing Sheets

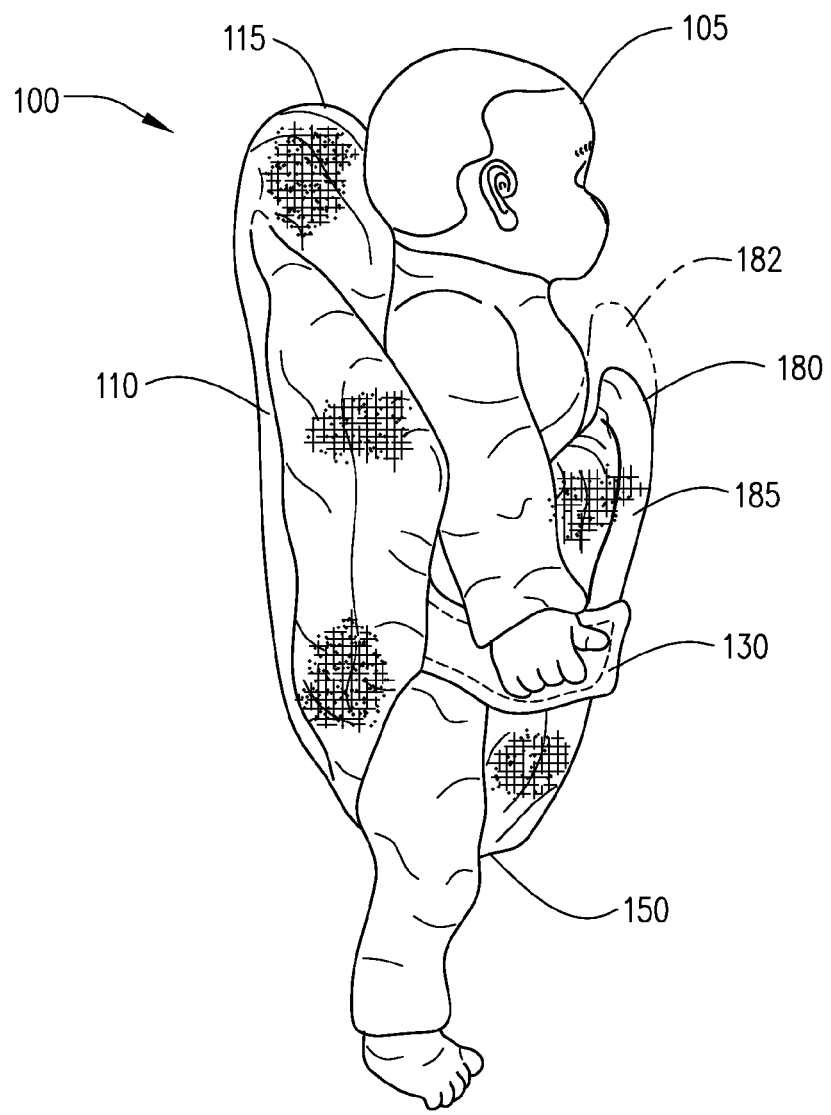

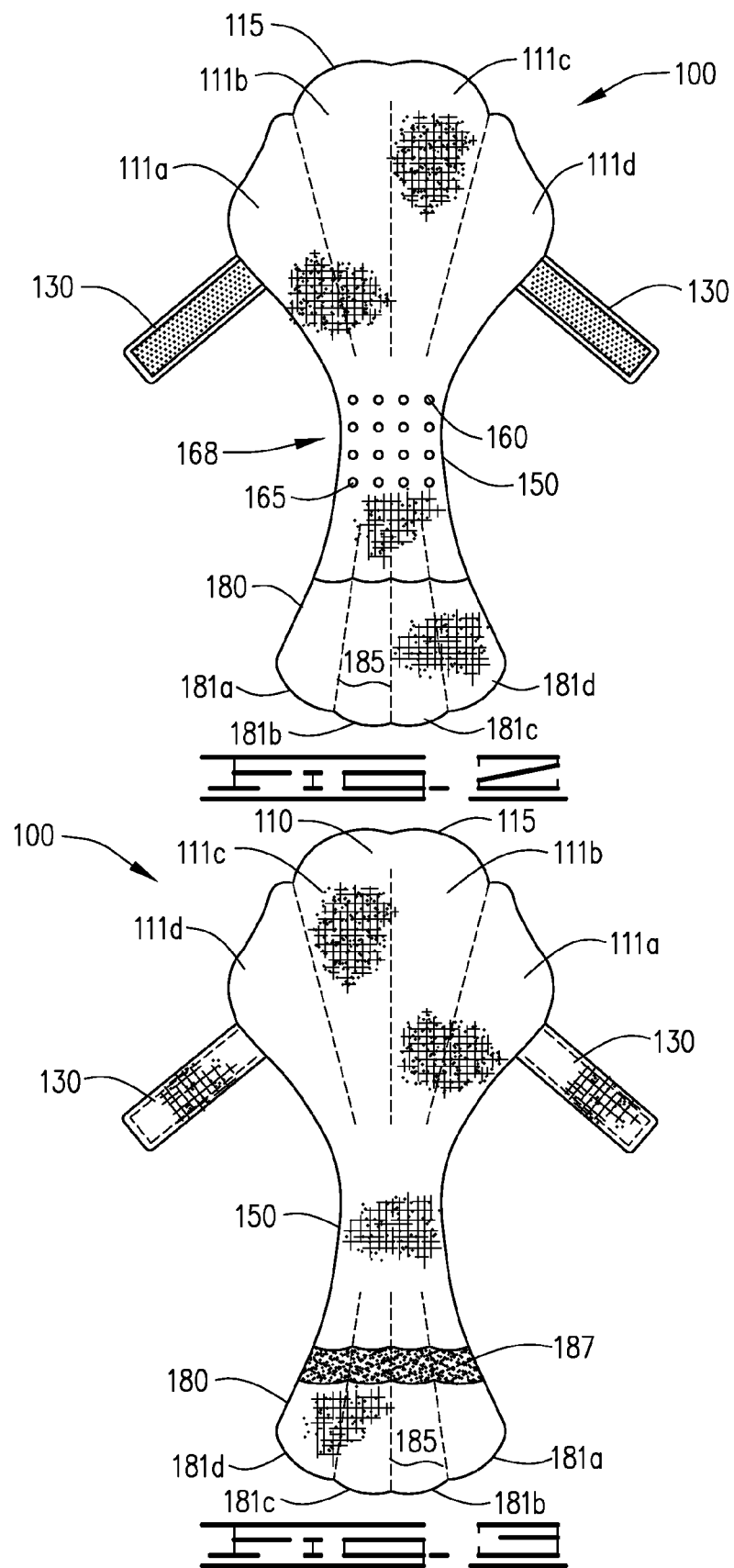

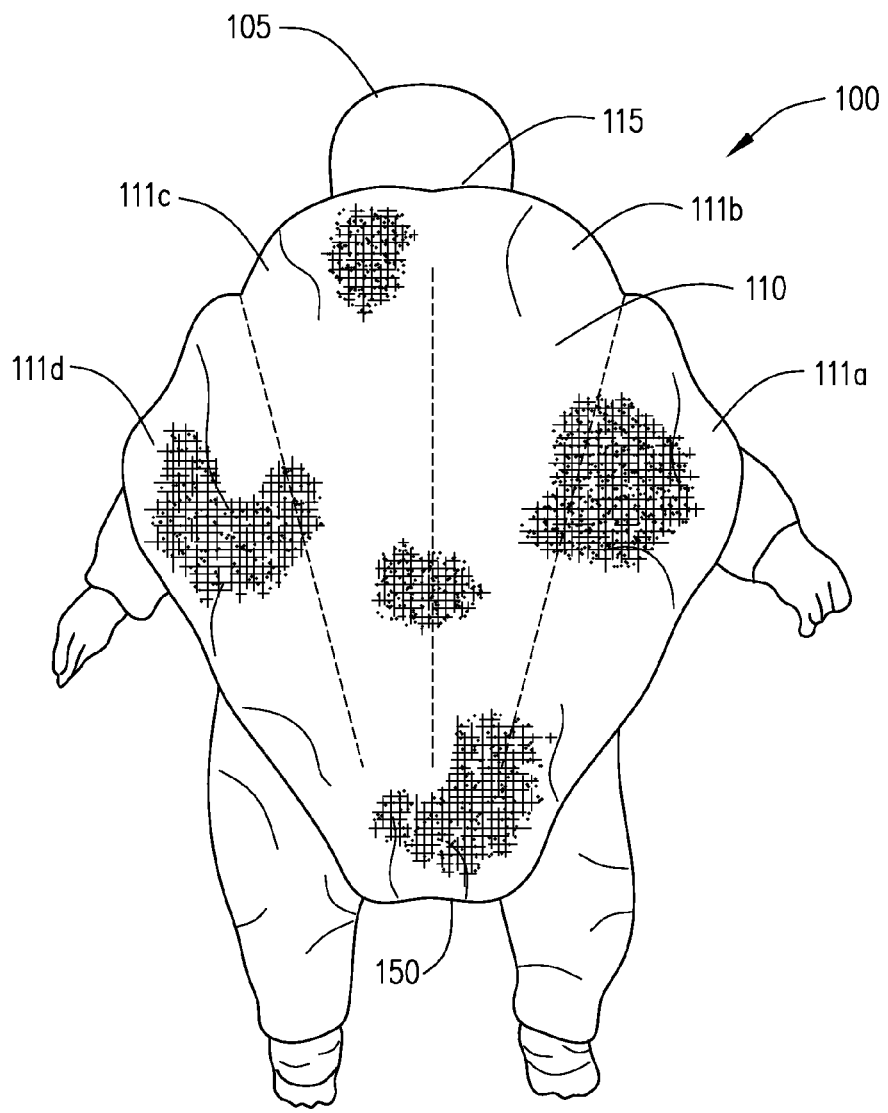
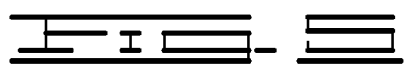

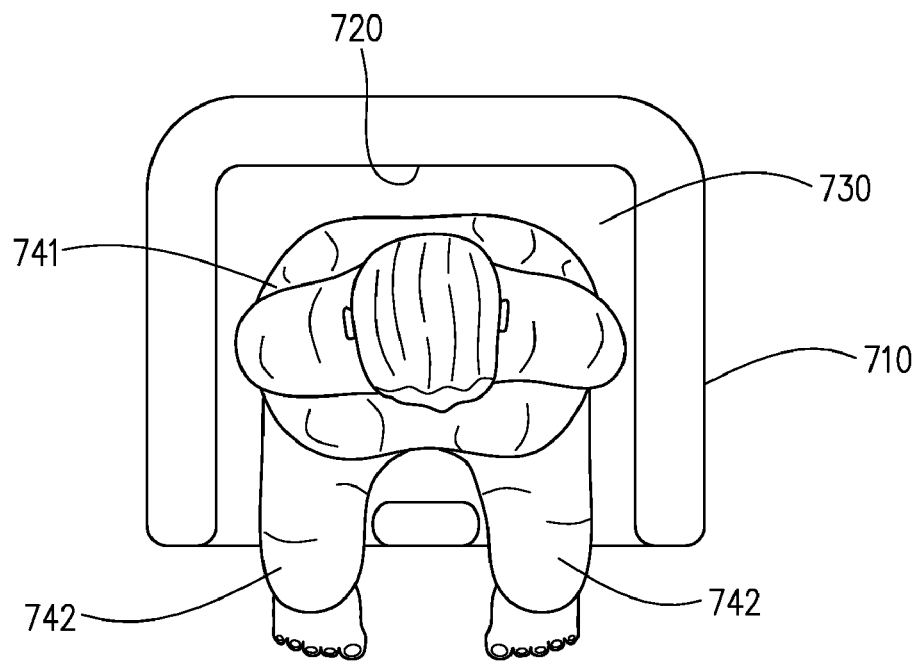
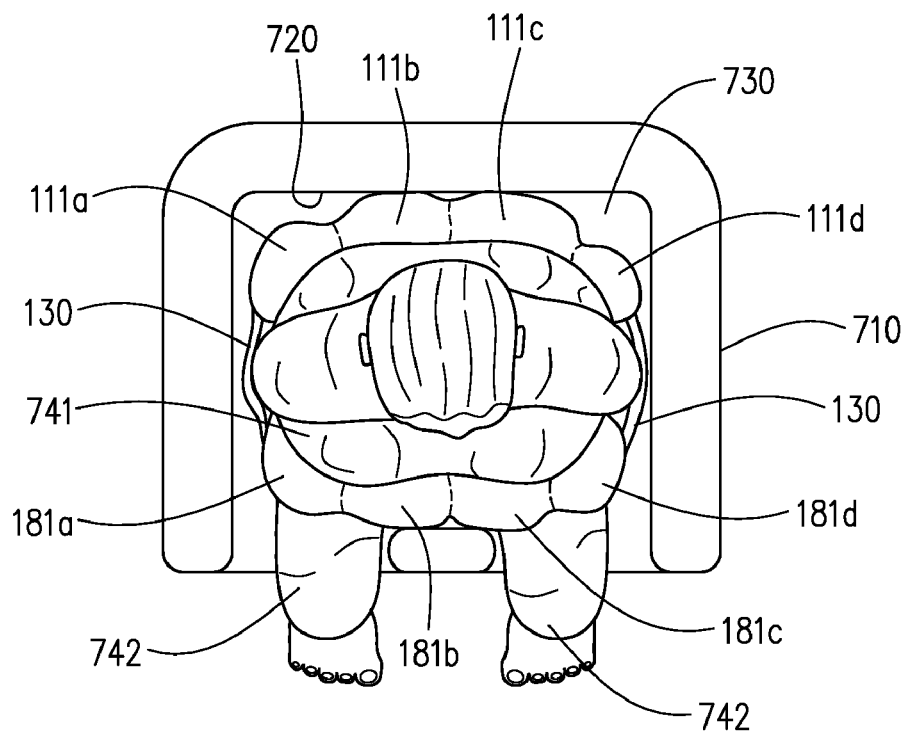
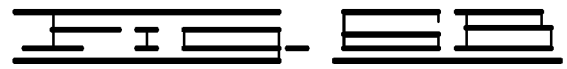

_US 7,862,115 B1_

PROTECTIVE DEVICE FOR DEVELOPING INFANTS

BACKGROUND OF THE INVENTION

The present invention generally relates to infant protective devices, and more particularly to a protective device to maintain an infant in an upright position and prevent the infant's head from sudden, extreme movement while the infant is in various seating systems.

The neck and head of a developing infant are disproportionately oversized and heavy as compared to the rest of the infant's torso during its early years and must be protected from excessive movement while the infant grows and develops its muscles to effectively provide muscular support to its own head and neck. During this early period, care must be taken to properly support the infant's head and neck in order to prevent injury to the infant's developing spinal column. The infant cannot support weight of its own head by the infant's immature muscles. If not externally supported during such actions as picking up the infant or maintaining the infant in a sitting position, then the head can slump of its own accord and injure the infant's spine or back.

As an infant develops with age, it is able to gradually sit upright for short periods of time, but the head and neck must still be protected against sudden movements that would allow the inertia of the head to move the neck into a damaging posture. To assist the infant in sitting upright, the child is often placed in a support device such as an exerciser, high chair, a swing, a walker, a grocery cart or the like, which provides leg openings and some form of support for the torso. However, in general, no support is provided for the neck and head. Often these support devices are oversized so that the infant is not in direct contact with the confines of the support device. This allows the infant to slip to one side or the other, ending up in an uncomfortable or even dangerous position. To secure the infant in these oversized support devices, the parents use various packing materials such as diapers, blankets, or pillows between the infant and the confines of the support device, in order to remove the gap. These packing materials are generally unsatisfactory and do not stay in position.

A number of patents have been proposed to address this need. U.S. Pa. No. 5,996,153, issued on Dec. 7, 1999, to Slater, discloses a torso support device that comprises an I-shaped padded member the fits between an infant's legs and is secured by fasteners around the infant's torso to support the infant in a sitting position. No mention is made in the disclosure of any feature that might limit the range of motion of the infant's head, thereby protecting the head and preventing whiplash caused by sudden changes in motion of the infant. U.S. Pat. No. 5,095,567 issued Mar. 17, 1992, to Kenoyer, discloses a baby back support device to aid in learning to sit. The device straps about the infant's buttocks with a strap across the lap. However, it does not provide direct support to the neck and head. A cushioned seating device for use by infants in shopping carts is disclosed in U.S. Pat. No. 5,547,250, issued Aug. 20, 1996, to Childers. The device fastens around the infant's torso but is not sufficiently elevated to support the infant's head. U.S. Pat. No. 5,551,749, issued Sep. 3, 1996, to Reher et al., discloses an infant support seat and cushion in combination, used to maintain the infant in an upright, seated position. The padded covering of the molded seat portion lacks padding along the infant's chest. No disclosure is made of any attempt to prevent the infant's head from sudden movements or to pad the head in the event of such sudden movements. Furthermore no provision is made to adjust the size of the apparatus to accommodate normal growth by the infant. U.S. Pat. No. 5,678,888, issued Oct. 21, 1997, to Sowell et al., discloses a seat cover which conforms to a shopping cart to protect children riding therein. However, none of these inventions provides sufficient protection for the infant's head and torso together.

As can be seen, there is a need for protective device for developing infants, which will securely hold the infant in an upright position in a walker, exercise device, swing, grocery cart, or similar device without excessive play about the seat that would otherwise allow the infant to move about within its confines. Furthermore, there is a need for an infant protective device that will protect the head and neck of the infant from damaging movement caused by sudden forces acting upon the seat. Also, it is desirable that such a device is able to be wrapped around the infant so as to be worn over the infant's clothing and/or diapers, and the device should be provide resistance to bodily fluids. Finally, the device should be easily attached about the infant.

SUMMARY OF THE INVENTION

An protective device for a developing infant is provided, which comprises a front portion that is generally shaped as a triangle; a back portion that is generally shaped as a triangle; a crotch portion connecting the front portion and back portion, with the crotch portion sized for comfortable positioning between the infant's legs; and a plurality of straps removably connecting the front portion to the rear portion, such that the front portion is aligned along the infant's anterior torso and the back portion is aligned along the infant's posterior torso.

More specifically, a protective device for a developing infant is provided, which comprises a triangularly-shaped back portion conformally aligned along the back of the infant, the back portion having a top edge positioned generally along the back of the infant's head, the back portion formed as a plurality of tapering, tubular shaped back sections extending and tapering away from the top edge of the back portion; a triangularly-shaped front portion conformally aligned along the chest and abdomen of the infant, the front portion having a top edge positioned generally and immediately below the infant's chin, the front portion formed as a plurality of tapering, tubular shaped front sections extending and tapering away from the top edge of the front portion; a crotch portion connecting a first point proximate the tapered ends of the front tubular structures in the front portion with a second point proximate the tapered ends of the back tubular sections of the front portion, the crotch portion sized for comfortable positioning between the infant's legs; and a plurality of straps removably connecting the front portion to the rear portion.

Furthermore, the invention provides a method of protectively supporting a developing infant, where the method comprises the steps of providing a support structure comprised of a triangularly-shaped back portion conformally aligned along the back of the infant, the back portion having a top edge positioned generally along the back of the infant's head, the back portion formed as a plurality of tapering, tubular shaped back sections extending and tapering away from the top edge of the back portion; a triangularly-shaped front portion conformally aligned along the chest and abdomen of the infant, the front portion having a top edge positioned generally and immediately below the infant's chin, the front portion formed as a plurality of tapering, tubular shaped front sections extending and tapering away from the top edge of the front portion; a crotch portion connecting a first point proximate the tapered ends of the front tubular structures in the front portion with a second point proximate the tapered ends of the back tubular sections of the front portion, the crotch portion sized for comfortable positioning between the infant's legs; and a fastening device that removably connects the front portion to the back portion; positioning the back portion along the infant's back; positioning the front portion along the infant's chest; and securing the front portion to the back portion by the fastening device along the flanks of the infant beneath the infant's arms.

These and other features, aspects, and advantages of the present invention will become better understood with reference to the following drawings, description, and claims.

BRIEF DESCRIPTION OF THE DRAWINGS

FIG. 1 shows a side perspective view of an infant having an infant protective device wrapped about the torso, according to an embodiment of the invention;

FIG. 2 shows an interior view of an infant protective device as it is laid on a flat surface, according to an embodiment of the invention;

FIG. 3 shows an exterior view of an infant protective device as it is laid on a flat surface, according to an embodiment of the invention; FIG. 5 shows a front view of an infant restraint device as it is worn by an infant, according to an embodiment of the invention;

FIG. 6A shows a top view of a generic seating enclosure containing an infant without the protective device, in order to illustrate the void formed between the infant and the interior of the seating enclosure, according to an embodiment of the invention; and FIG. 6B shows a top view of a generic seating enclosure containing an infant wearing the protective device, according to an embodiment of the invention.

FIG. 7A shows a top view of a generic seating enclosure containing an infant without the protective device, in order to illustrate the void formed between the infant and the interior of the seating enclosure, according to an embodiment of the invention; and FIG. 7B shows a top view of a generic seating enclosure containing an infant wearing the protective device, according to an embodiment of the invention.

DETAILED DESCRIPTION OF THE INVENTION

Figure 4:
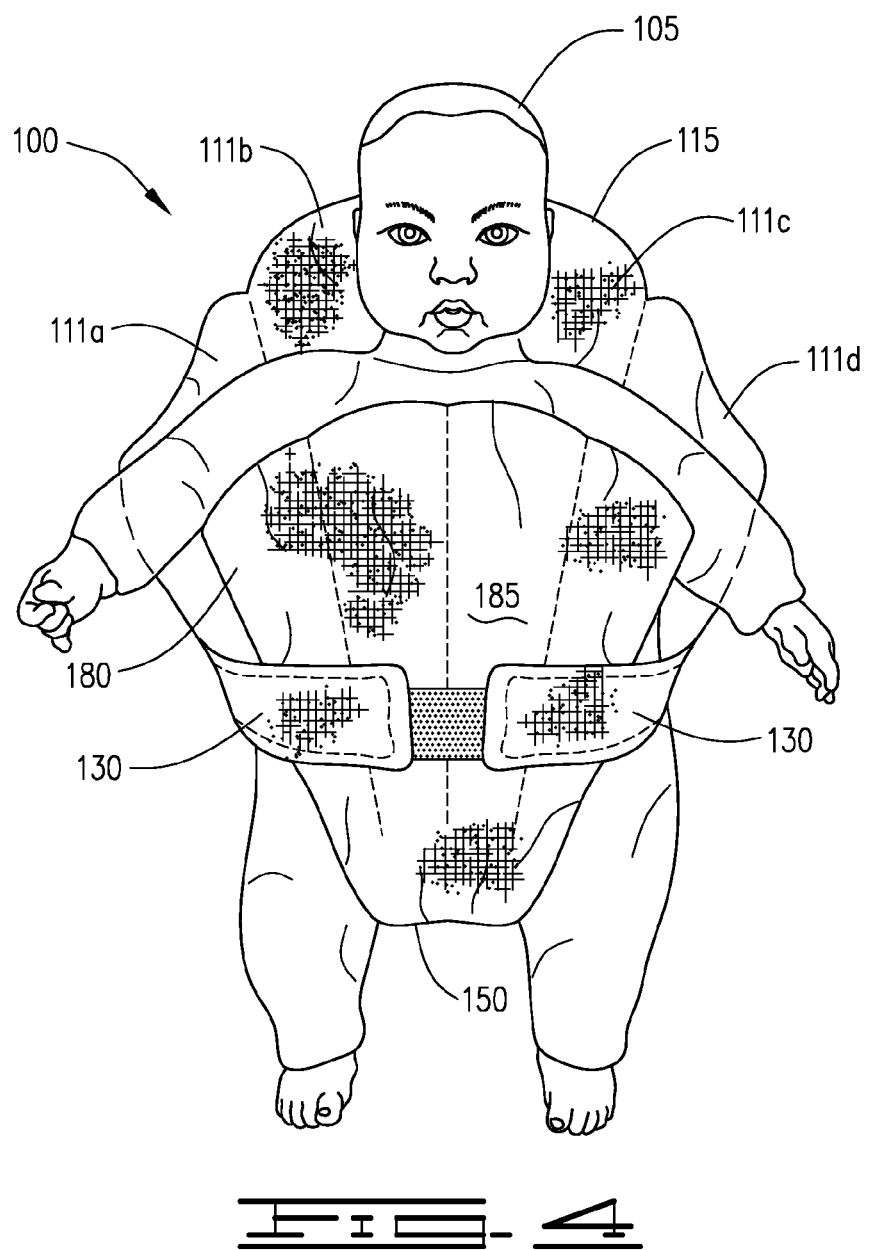
FIG. 4 shows a front perspective view of an infant protective device as it is worn by an infant, according to an embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the current invention includes devices and methods for providing an inventive protective device to be worn by an infant. The device provides protection for both the front and back of the infant and, when the infant is placed in an enclosure such as a seat with sides, fills in the voids between the infant and the seat enclosure. Thus the infant may be protected from injury resulting from sliding about within the confines of the seat and is thereby unable to accumulate sufficient momentum to cause injury if the infant were to strike the seat enclosure. This arrangement provides the additional advantage of supporting the infant in an upright position so that the infant does not slump in the seat enclosure. Furthermore, the inventive protective device may provide support for the infant's head. This may be accomplished by providing a neck support that is sufficiently high and padded to prevent the infant's head from being thrown back in the classic "whiplash" position. It may also provide a frontal protection to prevent the infant's head to be forced forward and thereby prevent facial injury against a hard surface, such as the edge of a seat enclosure or a tray of a highchair. The infant protective device provided by the invention may be washable to allow it to be cleaned in the event of bodily discharges and adjustable in the crotch area to accommodate a broader range of infant development than would be available with a fixed arrangement. Furthermore the inventive device may provide a means to adjust the device to accommodate a growing infant, within broad limits, to the point where the infant may no longer require protection against injury.

The invention may find application in numerous diverse situations in which the infant may be place in an upright position, such as high chairs, exercisers, playground swings, grocery carts, and the like. It may also find application for specialty child equipment having the trade names of JOHNNY JUMP-UP™ and EXCERSAUCER™. It may further find application for transporting the infant from place to place as by physically carrying the infant.

Referring now to FIG. 1, a side view of an embodiment 100 of an protective device for infants may be seen as it is wrapped about an infant 105. The device 100 may be spread out on a flat surface as shown in FIG. 2, so that its various aspects may be more easily displayed. FIG. 2 may show portions of the device that may come into direct contact with the infant 105 as the device is enclosed about the infant 105. The device 100 may be constructed with a back portion 110, a crotch portion 150, and a front portion 180. The back portion 110 may be positioned along the back, or posterior torso, of the infant 105, to extend up the infant's back to a point proximate the back of the infant's head. The back portion 110 may be constructed of a plurality of generally parallel, tubular structures 111a-111d, formed by a padding material contained between two layers of cloth material. Such tubular structures may be defined within the cloth material by stitching. Alternatively, individual tubular structures may be fabricated and stitched together along their lengths. It has been found that an even number of such tubular structures 111 may provide the best beneficial arrangement for supporting the infant, and in particular, four such tubular structures 111 may provide an optimal supporting structure.

Additionally, the upper ends of the two innermost tubular structures 111b, 111c may be made to merge at these upper ends to form a pillow 115 that may be beneficially positioned along the back of the infant's head. The U-shape formed by the upper end of tubular structure 111b, the pillow 115, and the upper end of tubular structure 111c may serve as a cradling support structure for the infant's head that may assist a caregiver in engaging the protective device to the infant while the infant is in a supine position.

The crotch portion 150 that may be positioned between the infant's legs and disposed to connect the back portion 110 and the front portion 180. A series of rows 168 of fastening devices 160, 165 may be configured within the crotch portion 150 so that they are not disposed to pinch or interfere with movement by the infant 105. These fastening devices 165, 166 may allow the crotch portion 150 to be reduced in expanse, by connecting fastening devices 165 in one row with fastening devices 160 in another row. This arrangement may form a pleat therebetween and thus reduce the length of the crotch portion 150. There are numerous such fastening devices 160, 165 well known in the art, such as snaps, buttons, zippers, hook and loop arrangements (i.e. Velcro®), and the like. Additionally, adjacent rows 168 may be loosely sewn together to shorten the length of the crotch portion 150 and ripped out to increase the length of the crotch portion 150. A further arrangement may separate the crotch portion 150 into two separate parts, one connected to the front portion 180 and one connected to the back portion 110, with one set of fastening devices 165 permanently connected to one part and the other set of fastening devices 166 connected to the other part; the parts may be joined at various points by the fastening devices 165, 166 to form a variable length crotch portion 150. These and other means for providing an adjustable crotch portion 150 may be used without departing from the scope of the invention. By positioning the crotch portion 150 between the infant's legs, the infant 105 may be more easily placed in a seating arrangement since it may align the legs so that they may be inserted into a seat.

The front portion 180 may be positioned along the infant's chest and abdominal areas (anterior torso), to extend towards and terminate at a point proximate the infant's chin. The front portion 180 may move along the chest of the infant depending upon how the infant is being positioned. In other words, the front portion 180 may be in the position shown when the infant is being held in the mother's arms, but it may advance to a position indicated by the numeral 182 when the infant with the device 100 is in a seated position, as in a high chair, a swing set, or some other commercial exercise device such as an Exersaucer™. The front portion 180 may be shaped as a generally triangular portion and constructed as a plurality of generally parallel tubular structures 181a-181d similar to those in the back portion 110. An even number of such tubular structures 181 may provide the best beneficial arrangement for supporting the infant, and in particular, four such tubular structures 181 may provide an optimal supporting structure. However, other numbers of tubular structures 181 may be used without departing from the scope of the invention. A waterproof panel 185 may be fabricated into a wall of the front portion 180, either on the interior side, the exterior side, or both, in order to provide protection for the infant protective device from discharge of bodily fluids from the infant's mouth and to aid the cleaning of the device. Each tubular structure 181a-181d may be filled with a padding material chosen for washability, loft, and resistance to compression over time. Such padding material may be such materials as cotton padding, foam, and the like. A closable pocket (not shown) may be optionally provided to allow the tubular structures 181a-181d or 111a-111d to be removed from the device 100 for replacement or cleaning separately from the remainder of the device 100. A closable pocket (not shown) may be provided with a means for sealing the tubular structure 181a-181d within the pocket to prevent accidental removal, as by means such as snaps, buttons, zippers, Velcro™, overlapping flaps, hooks, or other such means that are in common use in the clothing arts.

A pair of straps 130 may be provided to secure the infant protective device to the torso of the infant. These straps 130 may be arranged along opposing edges of the back portion 110 at an angle thereto. They may removably attach the back portion 110 to the front portion 180 with the infant therebetween and the straps 130 positioned under the infant's arms. The angle may be chosen so that the straps 130 may be generally horizontally disposed when engaged. Alternatively, the straps 130 may be arranged along opposing edges of the front portion 180 to removably attach the front portion 180 to the back portion 110. In still another alternative, integral flaps (not shown) may be provided in lieu of straps, where the integral flaps may be extensions of the covering material from which the front portion 180 or the back portion 110 is fabricated for attachment to the opposing portion. Tie strings may also be used in place of straps, but are not preferred because of the possibility of injury to the infant. Attachment of the straps 130 to either the front portion 180 or the back portion 110, as the case may be, may be provided by attachment means fabricated thereto. The attachment means may vary according to the manner in which the straps 130 may be engaged. In the embodiment shown in FIGS. 1 and 2, a hook-and-loop arrangement may be used in which a hook strip may be fabricated along the strap 130 and a loop strip may be fabricated along the front portion 180. However, other means of securing the front portion 180 to the back portion 110 may be used without departing from the scope of the invention, such as, for example, buckles, buttons, hooks and receivers, and the like.

Materials used to construct the front portion 180, crotch portion 150, and back portion 110 of the device may be chosen to provide ease of washing, resistance to tearing, and moderate elasticity to assist conformal fitting of the device to the torso of the infant. Materials used to construct the waterproof panel 185 may provide moisture resistance and ease of cleaning. Additionally, if the inventive device were used for supporting the infant in a wet environment, say, in a bathtub within a float ring to keep the infant's head above the water, then the entire device may be constructed of an appropriate waterproof or water resistant material, e.g. vinyl, Gore-Tex®, and the like.

The invention may also include a method for protectively supporting the infant and protecting it from harmful influences. The method may include a step of providing a protective device constructed essentially as described previously in this disclosure. The method may also include a step of placing the protective device on a flat, level surface. The method may also include a step of placing the infant in a supine position on the back portion 110 of the protective device, with the infant's head resting on the pillow 115 portion of the protective device. This step may illustrate an advantageous aspect of the protective device, such that a support may be provided for the infant's head while it is being positioned along the infant's torso, so that the infant's head does not extend downwardly towards the flat surface and thus does not arch the infant's back. The method may also include a step of bringing the front portion 180 up between the infant's legs to position the crotch portion 150 along the infant's torso and positioning the front portion 180 along the infant's frontal or chest area. The method may also include a step of engaging the fastening device along the flanks of the infant beneath the infant's arms in order to secure the front portion to the back portion.

Referring now to FIGS. 6A and 6B, the manner in which the inventive device is used is shown. Both figures show a top view of an infant's torso 741 seated within a generic seating enclosure 710 with an interior 720 into which the infant may be placed. Such seating enclosures 710 are generally arranged to allow for the infant's legs 742 to protrude from the seating enclosure. Because such seating enclosures 710 differ in size and infants torsos 741 differ in size, there is necessarily a void 730 between the infant's torso 741 and the interior 720 of the seating enclosure 710 as shown in FIG. 6A. It can be readily seen that such a void may allow the infant to slide about within the confines of the seating enclosure, so that the infant can accumulate sufficient momentum to cause injury if the infant were to strike the seat enclosure 710. FIG. 6B shows the same arrangement as FIG. 6A, but with the inventive device worn by the infant. As can be seen, tubular structures 111a-111d along the infant's back and tubular structures 181a-181d may contain sufficient padding to extend into and occupy a substantial portion of the void 730, thereby reducing the momentum that an infant could accumulate by sliding around within the seating enclosure 710 by reducing the distance between the interior 720 and the infant.

Other modifications to the infant protective device may be provided to enhance the usability of the device in everyday situations. For example, a loop (not shown) may be fabricated into the front portion 180 to provide an attachment point for articles such as pacifiers ("binkeys") and children's toys to keep them entertained.

Thus it may be seen that the invention provides an advantageous way of comfortably restraining an infant within a seating enclosure to provide protection from injury due to sudden and rapid movement. The invention is relatively simple and easy to manufacture, yet affords a variety of uses. While the description contains many specifics, these should not be construed as limitations on the scope of the invention, but rather as an exemplification of the preferred embodiments thereof. The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

I claim:

1. A protective system for an infant, the system comprising:
   a seating enclosure having an interior and a seat for receiving the infant in a sitting position;
   a void between the infant and the interior of the seating enclosure; and
   an infant protective device comprising
      a front portion that is generally shaped as a triangle;
      a back portion that is generally shaped as a triangle, the back portion having a top edge, the back portion further comprised of a plurality of generally parallel tubular structures, each structure continuously extending and tapering from the top edge towards a crotch portion, the top edge adapted for positioning generally at the back of the infant's head, each tubular structure defined by stitching and containing a padding material between two layers of cloth material, the padding material sufficient to form a tubular shape extending a substantial distance into the void to encounter an interior of the seating enclosure when the infant moves about within the seating enclosure, the padding material having sufficient stiffness when formed into the tubular structure to support the infant in a sitting position when the infant occupies the seating enclosure;
      the crotch portion connecting the front portion and back portion, the crotch portion sized for comfortable positioning between the infant's legs; and
      a plurality of straps removably connecting the front portion to the rear portion, wherein the front portion is adapted for alignment along the infant's anterior torso and the back portion is adapted for alignment along the infant's posterior torso.

2. The device described in claim 1, wherein the front portion is constructed of a plurality of generally parallel tubular structures that taper from a common top edge of the front portion towards the crotch portion.

3. The device described in claim 2, wherein the front portion is adapted to extend generally to a point proximate the infant's chin, wherein the infant's head is protected thereby from rapid and sudden forward motion.

4. The device described in claim 2, wherein the number of tubular structures is an even number.

5. The device described in claim 4, wherein the number of tubular structures is four.

6. The device described in claim 1, wherein the number of tubular structures is an even number.

7. The device described in claim 6, wherein the number of tubular structures is four.

8. The device described in claim 1, wherein a first end of each strap is connected to an edge of the back portion and a second end of each strap is removably secured to the front portion.

9. An infant protective system for an infant comprising:
   a seating enclosure supporting the infant in an upright seated position, the seating enclosure with an interior and a seat, the seating enclosure defining a void between the infant and the interior of the seating enclosure; and
   a protective device comprising
      a triangularly-shaped back portion adapted for conformal alignment along the back of the infant, the back portion having a top edge adapted for positioning generally along the back of the infant's head, the back portion formed as a plurality of tubular shaped back sections extending and tapering away from the top edge of the back portion, wherein the infant's head is prevented from moving rapidly and suddenly rearward;
      a triangularly-shaped front portion adapted for conformal alignment along the chest and abdomen of the infant, the front portion having a top edge adapted for positioning generally and proximate the infant's chin, the front portion formed as a plurality of tubular shaped front sections extending and tapering away from the top edge of the front portion, wherein the front portion provides a frontal protection to prevent the infant's head from falling forward and thereby prevent facial injury against a hard surface;
      each tubular shaped section of the front portion and the back portion defined by stitching along two layers of cloth material, each section filled with a padding material sufficient to form a tube shape extending a distance into the void, the padding material having sufficient stiffness when formed into the tubular structure to encounter the interior and prevent the infant from slumping;
      a crotch portion connecting a first point proximate the tapered ends of the front tubular structures in the front portion with a second point proximate the tapered ends of the back tubular sections of the back portion, the crotch portion adapted for comfortable positioning between the infant's legs; and
      a plurality of straps removably connecting the front portion to the rear portion.

10. The device described in claim 9, wherein the crotch portion has a plurality of generally parallel rows of fastening devices arranged for connection of fastening devices in a first row with fastening devices in a second row, wherein a pleat is formed therebetween to reduce a length of the crotch portion.

11. The device described in claim 9, wherein the front portion has a waterproof panel aligned along the top edge of the front portion, wherein the waterproof panel is positioned to receive any discharge from the mouth of the infant.

12. The device described in claim 11, wherein the waterproof panel is positioned along an interior side of the front portion.

13. The device described in claim 11, wherein the waterproof panel is positioned along the exterior side of the front portion.

14. The device described in claim 9, wherein
the plurality of tubular shaped back sections comprises at least three tubular shaped back sections generally aligned in a row, wherein the two tubular shaped back sections having only one adjacent tubular shaped back section are designated as outermost sections and the remaining tubular shaped back sections are designated as innermost back sections; and
the innermost back sections each have a top end, the top ends forming a pillow along the top edge of the back portion.

15. A method of protectively supporting an infant in a seated position, the method comprising the steps of:
providing a seating enclosure with an interior and a seat, the seating enclosure adapted to receive an infant in a sitting position within the interior, wherein a void is formed thereby between the infant and the interior;
providing a protective device comprised of a triangularly-shaped back portion adapted for conformal alignment along the back of the infant, the back portion having a top edge adapted for positioning generally along the back of the infant's head, the back portion formed as a plurality of tapering, tubular shaped back sections extending and tapering away from the top edge of the back portion; a triangularly-shaped front portion adapted for conformal alignment along the chest and abdomen of the infant, the front portion having a top edge adapted for positioning generally and proximate the infant's chin, the front portion formed as a plurality of tapering, tubular shaped front sections extending and tapering away from the top edge of the front portion; a crotch portion connecting a first point proximate the tapered ends of the front tubular structures in the front portion with a second point proximate the tapered ends of the back tubular sections of the front portion, the crotch portion sized for comfortable positioning between the infant's legs; and a fastening device that removably connects the front portion to the back portion;
positioning the back portion along the infant's back;
positioning the front portion along the infant's chest;
filling each tubular shaped section with a padding material sufficient to form a tubular structure extending a distance into the void to encounter the interior, the padding material having sufficient stiffness when formed into the tubular structure to support the infant in the sitting position when the infant occupies the seating enclosure;
securing the front portion to the back portion by the fastening device along the flanks of the infant beneath the infant's arms; and
positioning the protective device within the seating enclosure, wherein the protective device at least partially fills the void between the infant and the interior.

16. The method described in claim 15, wherein the method of positioning the back portion along the infant's back and positioning the front portion along the infant's chest
placing the protective device on a flat, level surface; and
placing the infant in a supine position on the protective device, with the infant's head resting on a pillow portion of the protective device.

17. An infant protective system comprising:
a seat enclosure receiving an infant for seated activity, the seat enclosure having an interior and a seat;
a protective device enclosing the infant, the device substantially occupying a void between the infant and the seat enclosure to restrain the infant from sliding about within the confines of the seat enclosure, the device comprising:
a front portion that is generally shaped as a triangle;
a back portion that is generally shaped as a triangle, the back portion having a top edge, the back portion further comprised of a plurality of generally parallel tubular structures, each structure continuously extending and tapering from the top edge towards a crotch portion, the top edge adapted for positioning generally at the back of the infant's head;
a crotch portion connecting the front portion and back portion, the crotch portion sized for comfortable positioning between the infant's legs;
a plurality of straps removably connecting the front portion to the rear portion, wherein the front portion is adapted for alignment along the infant's anterior torso and the back portion is adapted for alignment along the infant's posterior torso wherein, each tubular structure is filled with a padding material sufficient to form a tube shape extending a substantially distance into the void, the padding material having sufficient stiffness to hold the infant in an upright sitting position to thereby prevent the infant from slumping.

* * * * *